United States Patent
Kobayashi

(10) Patent No.: US 9,053,867 B2
(45) Date of Patent: Jun. 9, 2015

(54) ENERGY STORAGE CELL AND ENERGY STORAGE MODULE

(75) Inventor: Shigemi Kobayashi, Higashimatsuyama (JP)

(73) Assignee: UD TRUCKS CORPORATION, Saitama (JP)

( * ) Notice: Subject to any disclaimer, the term of this patent is extended or adjusted under 35 U.S.C. 154(b) by 156 days.

(21) Appl. No.: 13/703,767

(22) PCT Filed: May 19, 2011

(86) PCT No.: PCT/JP2011/061523
§ 371 (c)(1),
(2), (4) Date: Dec. 12, 2012

(87) PCT Pub. No.: WO2012/002058
PCT Pub. Date: Jan. 5, 2012

(65) Prior Publication Data
US 2013/0083453 A1    Apr. 4, 2013

(30) Foreign Application Priority Data
Jul. 1, 2010    (JP) .................................. 2010-151152

(51) Int. Cl.
*H01G 11/78*    (2013.01)
*H01G 4/224*    (2006.01)
(Continued)

(52) U.S. Cl.
CPC ............... *H01G 9/155* (2013.01); *H01G 4/224* (2013.01); *H01G 2/04* (2013.01); *H01G 11/10* (2013.01);
(Continued)

(58) Field of Classification Search
CPC ......... H01G 9/008; H01G 9/155; H01G 2/04; H01G 9/08; H01G 9/10; H01G 2/106; H01G 4/38; H01G 11/74; H01G 11/82; H01G 4/228; H01G 11/78; H01G 4/224

USPC ......... 361/328, 517, 519, 520, 522, 535, 537, 361/538, 541
See application file for complete search history.

(56) References Cited

U.S. PATENT DOCUMENTS 6,995,969 B2    2/2006    Araki et al.
2009/0323254 A1 *    12/2009    Yamane et al. ............... 361/520
(Continued)

FOREIGN PATENT DOCUMENTS

CN    201112425 Y    9/2008
CN    201601153 U    10/2010
(Continued)

OTHER PUBLICATIONS

International Search Report and Written Opinion corresponding to PCT/JP2011/061523, dated Aug. 23, 2011.
(Continued)

*Primary Examiner* — Dion R Ferguson
(74) *Attorney, Agent, or Firm* — Lowe Hauptman & Ham, LLP

(57) ABSTRACT

An energy storage cell includes an energy storage part for storing electric charges, a container for housing the energy storage part, and a pair of electrode terminals connected to the energy storage part and exposed to the outside of the container. The container is formed to have a thick polygonal outer shape and a groove part linearly extending in a direction perpendicular to a thickness direction is provided in each of a pair of mutually facing side surfaces of the polygonal shape. Each of the electrode terminals includes a base end part connected to a corresponding polarity of the energy storage part in the container and an exposed part exposed to the outside of the container, and the exposed part is formed along an inner side of the groove part.

12 Claims, 18 Drawing Sheets

(51) Int. Cl.
  *H01G 9/00* (2006.01)
  *H01G 2/04* (2006.01)
  *H01G 11/10* (2013.01)
  *H01G 11/74* (2013.01)
  *H01M 2/02* (2006.01)
  *H01M 2/20* (2006.01)
  *H01M 2/30* (2006.01)

(52) U.S. Cl.
  CPC ............... *H01G 11/74* (2013.01); *H01G 11/78* (2013.01); *H01M 2/0207* (2013.01); *H01M 2/204* (2013.01); *H01M 2/30* (2013.01); *Y02E 60/13* (2013.01)

(56) References Cited

U.S. PATENT DOCUMENTS

2010/0053927 A1* 3/2010 Inoue et al. .................... 361/830
2010/0136461 A1  6/2010 Tsujiko et al.

FOREIGN PATENT DOCUMENTS

| | | |
|---|---|---|
| JP | 2002-353078 A | 12/2002 |
| JP | 2003-272966 A | 9/2003 |
| JP | 2003-272972 A | 9/2003 |
| JP | 2003-272974 A | 9/2003 |
| JP | 2005-190885 A | 7/2005 |
| JP | 2006-108380 A | 4/2006 |
| JP | 2006-338934 A | 12/2006 |
| JP | 3869183 B2 | 1/2007 |
| JP | 2008-204985 A | 9/2008 |
| JP | 2008-277042 A | 11/2008 |
| JP | 2008-300593 A | 12/2008 |

OTHER PUBLICATIONS

Office Action dated Jan. 6, 2015, corresponding to Chinese patent application No. 201180030198.2.

* cited by examiner

ENERGY STORAGE CELL AND ENERGY STORAGE MODULE

FIELD OF THE INVENTION

The present invention relates to an energy storage cell and an energy storage module constituted by a plurality of energy storage cells.

BACKGROUND OF THE INVENTION

JP2003-272972A, JP2006-108380A, JP2003-272966A, JP3869183B, JP2006-338934A, JP2008-204985A, JP2002-353078A and JP2005-190885A propose an electric double-layer capacitor, a lithium-ion battery and the like as an energy storage cell which is quickly rechargeable and has a long charge/discharge cycle life.

An example is described with reference to FIG. 22. An energy storage cell 100 is an electric double-layer capacitor. The energy storage cell 100 includes an energy storage part for storing electric charges and a container 111 for containing the energy storage part.

The energy storage part is a laminated body composed of a positive electrode, a negative electrode and a separator interposed between the positive electrode and the negative electrode. The positive electrode and the negative electrode are composed of an electrode layer for storing electric charges and a collector layer through which electric charges are charged and discharged. The electrode layer is a polarizable electrode containing an electrolyte. A positive electrode terminal 112A whose polarity corresponds to that of the collector layer of the positive electrode is joined to the positive electrode. A negative electrode terminal 112B whose polarity corresponds to that of the collector layer of the negative electrode is joined to the negative electrode.

The electrode terminal 112 is formed of a material having good electrical conductivity and into a short rectangle form. A collector electrode having a corresponding polarity is joined to a base end part of the electrode terminal 112 located inside the container 111. A tip end part of the electrode terminal 112 is drawn out to the outside of the container 111. The container 111 is, for example, formed of a laminated film which is a resin film having a laminated structure. The container 111 is sealed after housing the energy storage part such that the tip end part of each electrode terminal 112 projects to the outside.

In the energy storage cell 100 of FIG. 22, the container 111 is composed of a pair of container parts which are so combined that recessed parts thereof face each other. In the energy storage cell 100, a chamber for housing the energy storage part is defined in the container 111 by the pair of recessed parts. The energy storage part is sealed in a state where the leading end side of each terminal 112 projects to the outside by thermally fusing flange parts surrounding the chamber to each other. The energy storage cell 100 includes a degassing valve 115 for suppressing an internal pressure of the container 111 to or below a predetermined level.

A withstand voltage of the single energy storage cell 100 as shown in FIG. 22 is about 3 to 5 V. A predetermined number of energy storage cells 100 are used by being connected in series to obtain a necessary power-supply voltage.

An energy storage module M100 constituted by a predetermined number of energy storage cells 100 is shown in FIG. 23. The energy storage cells 100 are arranged in a line in a thickness direction of the containers 111 to become an overlapping assembly. The electrode terminals 112 having different polarities are electrically connected between adjacent energy storage cells 100.

SUMMARY OF THE INVENTION

In the energy storage module M100 constituted by the energy storage cells 100, there are many restrictions in the arrangement and layout of the energy storage cells 100 due to a connection structure for electrically connecting the energy storage cells 100 to each other, and adaptability to intended uses is poor. For example, since the energy storage cells 100 cannot be flexibly arranged and laid out depending on an installation site, an unnecessary space may be formed.

The electrode terminals 112 are bent for being easily joined, but a projecting length E of the electrode terminals 112, which is the length of parts drawn out from the containers of the energy storage cells 100, accordingly becomes longer. Thus, a large space is necessary outside the container 111 to electrically connect the energy storage cells 100. Further, since the electrode terminals 112 project to the outside of the containers 111, an insulating cover to prevent an electric shock and the like is necessary. Thus, a volume occupied by the energy storage module M100 may be increased.

The present invention aims to provide an effective means for solving possible problems as described above.

To achieve the object described above, this invention provides an energy storage cell. The energy storage cell includes an energy storage part for storing electric charges, a container for housing the energy storage part, and a pair of electrode terminals connected to the energy storage part and exposed to the outside of the container. The container is formed to have a thick polygonal outer shape and a groove part linearly extending in a direction perpendicular to a thickness direction is provided in each of a pair of mutually facing side surfaces of the polygonal shape, and each of the electrode terminal includes a base end part connected to a corresponding polarity of the energy storage part in the container and an exposed part exposed to the outside of the container and the exposed part is formed along an inner side of the groove part.

The details as well as other features and advantages of this invention are set forth in the remainder of the specification and are shown in the accompanying drawings.

DESCRIPTION OF EMBODIMENTS

Figure 1A:
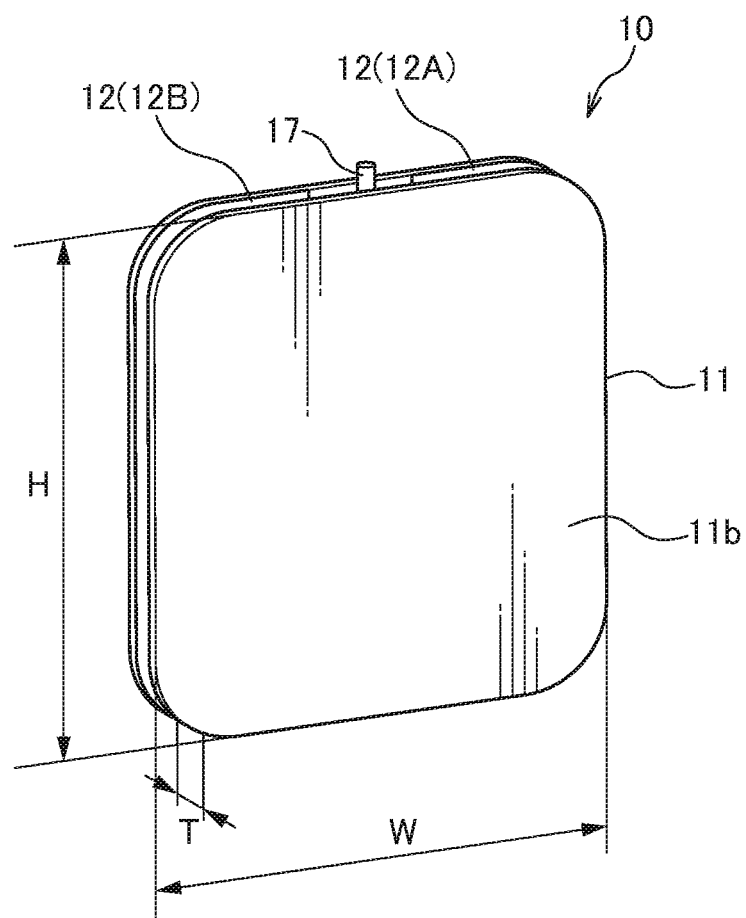
FIG. 1A is a perspective view of an energy storage cell according to a first embodiment of the present invention.
Figure 3:
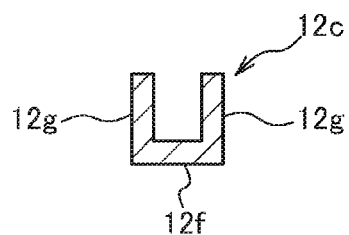
FIG. 3 is a sectional view of an electrode terminal.
Figure 4:
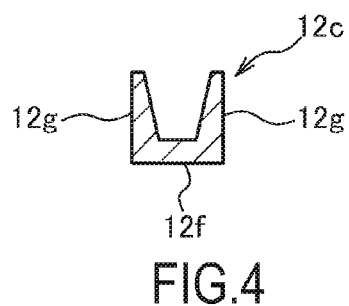
FIG. 4 is a sectional view showing a modification of the electrode terminal.
Figure 5:
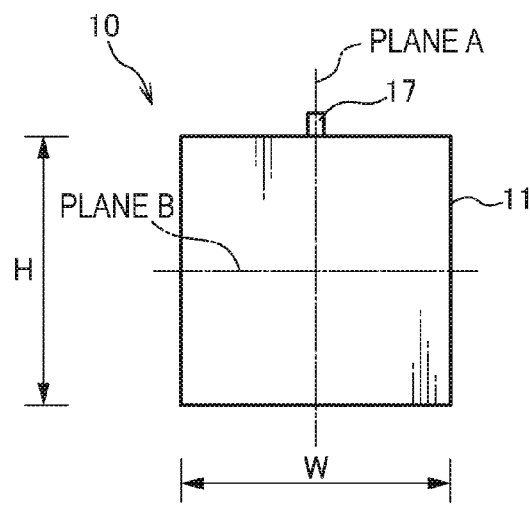
FIG. 5 is a view explaining the arrangement of the electrode terminal.

First, with reference to FIGS. 1A to 5, an energy storage cell 10 according to a first embodiment of the present invention is described. In the following description, W, H and T denote the width, height and thickness of the energy storage cell 10 as shown in FIG. 1A. The following description is made with a plane bisecting the width W of the energy storage cell 10 as a plane A and a plane bisecting the height H as a plane B as shown in FIG. 5.

Figure 1B:
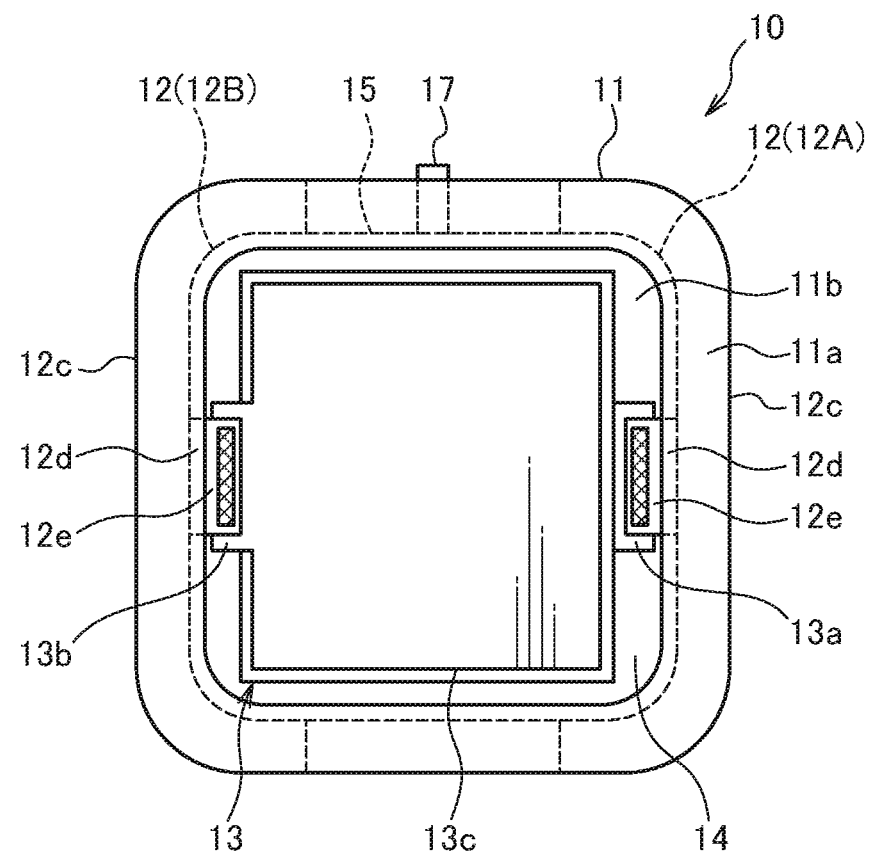
FIG. 1B is a front view of the energy storage cell in a state where a front film is removed.

The energy storage cell 10 is an electric double-layer capacitor. As shown in FIG. 1B, the energy storage cell 10 includes an energy storage part 13 for storing electric charges, a container 11 for housing the energy storage part 13 and a pair of electrode terminals 12 through which electric charges are charged into and discharged from the energy storage part 13.

As shown in FIG. 1B, the energy storage part 13 is a laminated body in which a positive electrode 13a, a negative electrode 13b and a separator 13c interposed between the positive electrode 13a and the negative electrode 13b are laminated. The energy storage part 13 is housed in the container 11 together with an electrolyte.

The positive electrode 13a and the negative electrode 13b are formed by an electrode layer for storing electric charges, i.e. a polarizable electrode, and a collector layer through which electric charges are charged and discharged, i.e. a collector electrode. Leads of the collector electrodes having the same polarity are bundled to the positive electrode 13a and the negative electrode 13b, thereby forming bundled parts. The electrode terminal 12 having a corresponding polarity is joined to the bundled part of each of the positive electrode 13a and the negative electrode 13b.

As shown in FIG. 1A, the container 11 has a thick polygonal outer shape. The container 11 includes two congruent rectangular bottom surfaces formed to be parallel to each other and rectangular side surfaces respectively formed on four sides of the bottom surfaces. In the container 11, four corner parts of the rectangular bottom surfaces are rounded to have an arcuate shape. The container 11 may be shaped to include bottom surfaces having a polygonal shape other than a rectangular shape and as many side surfaces as the sides of the bottom surfaces.

As shown in FIG. 1B, the container 11 is composed of a frame body 11a in the form of a frame surrounding the energy storage part 13 and films 11b attached to the frame body 11a. The frame body 11a forms the side surfaces of the container 11 and the films 11b form the bottom surfaces of the container 11. A chamber 14 for housing the energy storage part 13 is formed by the frame body 11a and the films 11b in the container 11.

The frame body 11a is a thick polygonal frame body formed of a thermally fusible resin with electric insulation property. The frame body 11a is formed to have a rectangular shape constituted by four side parts of an upper side part, a lower side part, a right side part and a left side part. The frame body 11a is shaped to surround the energy storage part 13. The frame body 11a is formed with a space which is surrounded by the four side parts and open in both front and rear surfaces.

The frame body 11a is formed, for example, by injection molding. The frame body 11a is formed with a pair of electrode terminals 12 and a degassing valve 17 for suppressing an internal pressure of the chamber 14 in the container 11 to or below a predetermined level by insert molding. The frame body 11a is formed by mounting the pair of electrode terminals 12 and the degassing valve 17 in a mold in advance and filling a molten resin thereinto.

Flange-shaped projections 18 standing on the outer peripheries of end parts of the both front and rear surfaces are respectively formed on the four side parts of the frame body 11a. The frame body 11a is formed with a groove part 15 between the projections 18 facing each other in a front-back direction.

The both front and rear surfaces of the frame body 11a are extended outward by the projections 18. In this way, adhesion areas necessary to obtain sufficient strength and durability of adhering parts of the frame body 11a and the films 11b are ensured.

Figure 2:
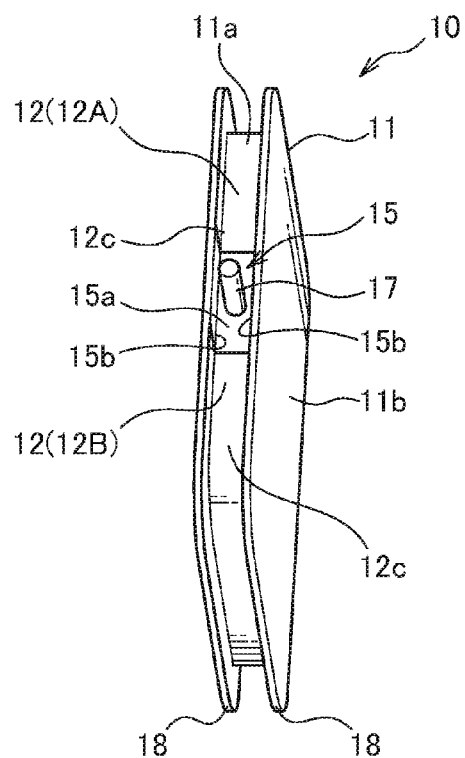
FIG. 2 is a perspective view of the energy storage cell.

As shown in FIG. 2, the groove part 15 is a U-shaped recess formed on the outer periphery of the frame body 11a. The groove part 15 includes a bottom surface 15a annularly formed along the outer periphery of the container 11 and a pair of facing surfaces 15b standing on both ends of the bottom surface 15a.

The groove part 15 is formed over the entire circumference to circle around all the side surfaces of the container 11. The groove part 15 only has to be linearly formed in a direction perpendicular to a direction of the thickness T at least on each of a pair of facing side surfaces of the container 11.

The film 11b is a sheet formed of a laminated film which is a resin laminated film having an intermediate layer made of a metal foil. The film 11b is formed to have substantially the same shape and size as the both front and rear surfaces of the frame body 11a.

The films 11b are respectively thermally fused to the both front and rear surfaces of the frame body 11a. By thermally fusing the films 11b, the space that is open in the both front and rear surfaces of the frame body 11a is sealed. In this way, the chamber 14 shown in FIG. 1B is defined in the container 11.

As shown in FIG. 1B, one end of the electrode terminal 12 is connected to the energy storage part 13 and the other end thereof is exposed to the outside of the container 11. A pair of electrode terminals 12 is provided and the polarities thereof differ from each other. The electrode terminals 12 include a positive electrode terminal 12A connected to the positive electrode 13a of the energy storage part 13 and a negative electrode terminal 12B connected to the negative electrode 13b of the energy storage part 13. The positive electrode terminal 12A and the negative electrode terminal 12B are respectively provided on a pair of mutually facing side surfaces of the container 11.

When a pair of groove parts 15 is respectively formed on a pair of facing side surfaces of the container 11, one electrode terminal 12 is arranged in one groove part 15 and the other electrode terminal 12 is arranged in the other groove part 15.

As shown in FIG. 1B, the electrode terminal 12 is composed of an exposed part 12c exposed to the outside of the container 11, a base end part 12e connected to the collector layer having a corresponding polarity in the container 11, and an intermediate part 12d connecting the exposed part 12c and the base end part 12e.

The intermediate part 12d is embedded in the resin forming the frame body 11b together with an intermediate part of the degassing valve 17. By embedding the intermediate part 12d in the frame body 11a, the electrode terminal 12 is fixed to the frame body 11a. By omitting the intermediate part 12d, a part of the base end part 12e may be fixed to the frame body 11a.

The base end part 12e projects into the chamber 14 in the container 11. A lead of the positive electrode 13a is bundled and jointed to the base end part 12e of the positive electrode terminal 12A. A lead of the negative electrode 13b is bundled and joined to the base end part 12e of the negative electrode terminal 12B. That is, a bundled part in which the lead having a corresponding polarity is bundled is joined to the base end part 12e.

As shown in FIG. 2, the exposed part 12c is formed to have a U-shape extending from one side surface of the container 11 to the side surfaces on the opposite ends of the one side surface. The exposed part 12c is formed to continuously extend from a surface of the groove part 15 parallel to the plane A to surfaces perpendicular to the plane A. That is, the exposed part 12c is formed to extend from the side surface of the container 11 extending along a direction of the height H to the side surfaces continuously formed from the opposite ends of this side surface and extending along a direction of the width W. The exposed parts 12c of the electrode terminals 12 are respectively arranged to be symmetrical with each other with respect to the plane A shown in FIG. 5.

Figure 22:
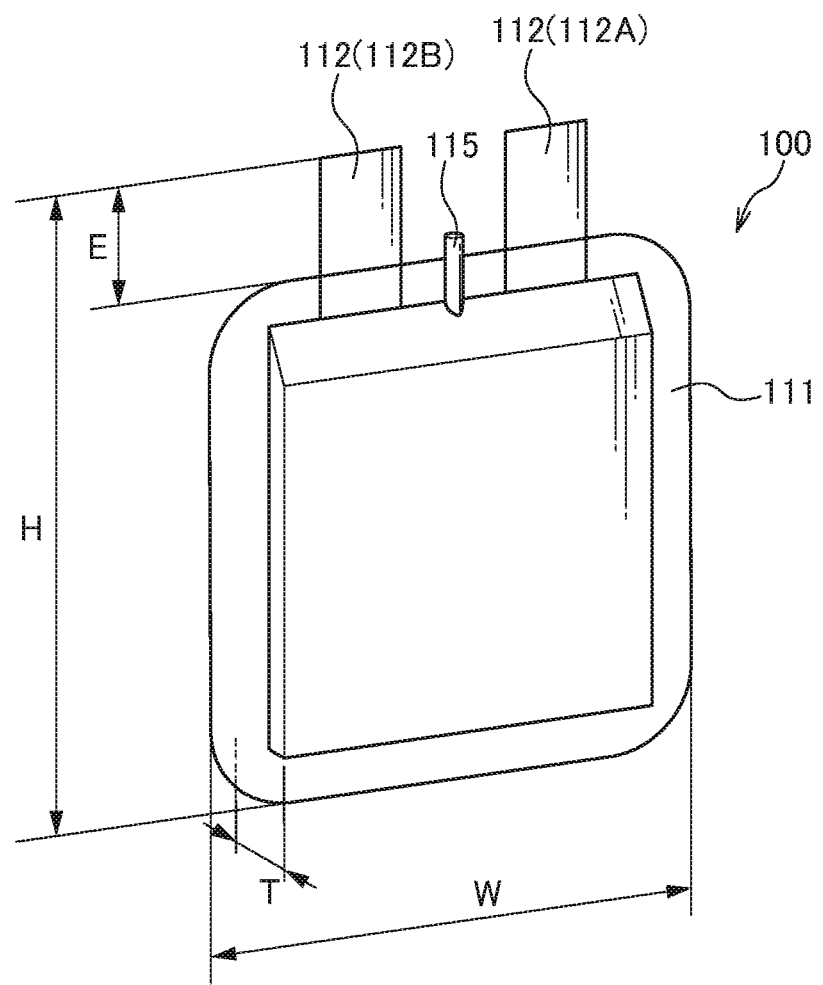
FIG. 22 is a perspective view showing an example of a conventional energy storage cell.
Figure 23:
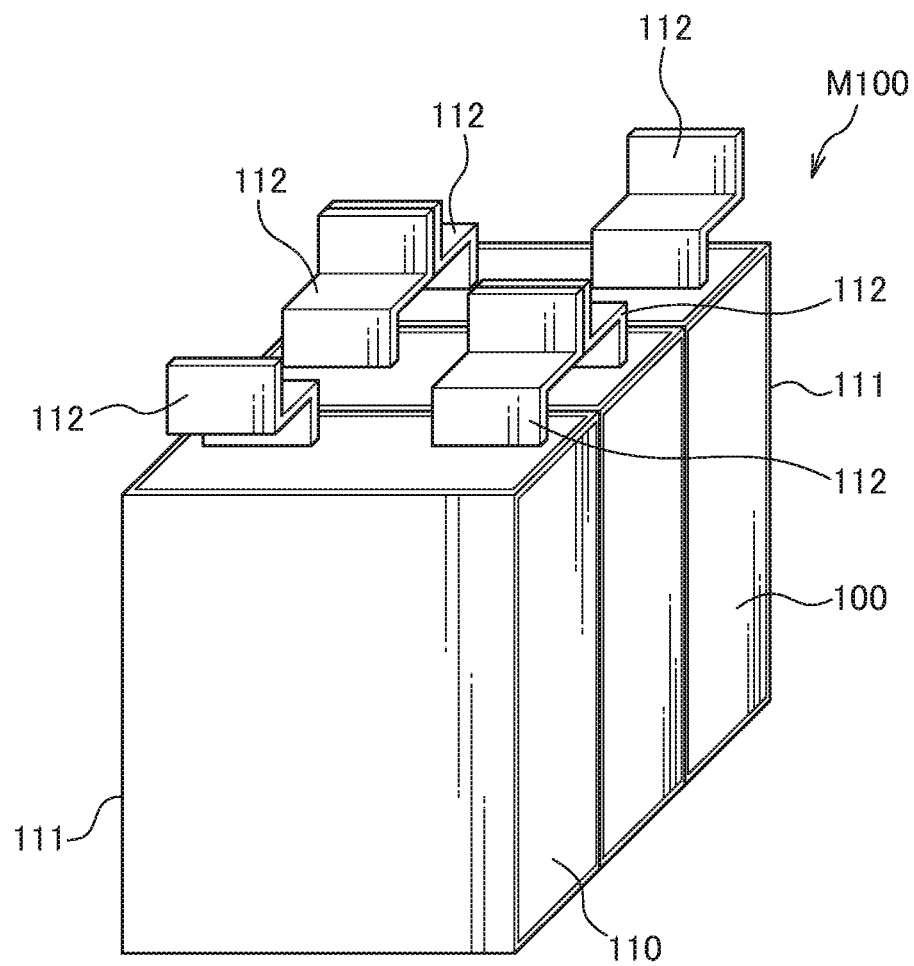
FIG. 23 is a perspective view showing an example of a conventional energy storage module.

As shown in FIG. 3, the exposed part 12c is formed to extend along the groove part 15 and have a U-shaped cross-section. Thus, in the energy storage cell 10, the electrode terminals 12 do not project out of the container 11 unlike the conventional energy storage cell 100 shown in FIG. 22. Therefore, the size of the energy storage cell 10 including the electrode terminals 12 can be reduced. Specifically, a volume occupied by the energy storage cell 10 can be reduced. If the energy storage cell 10 is compared with the conventional energy storage cell 100 shown in FIG. 22, the height H of the energy storage cell 10 is reduced by as much as the projecting length E of the electrode terminals drawn out from the container. Accordingly, volumetric efficiency which is an energy storage capacity per unit volume of the energy storage cell 10 is improved.

Each exposed part 12c may be formed to have such a cross-sectional shape that the opposite side surfaces stand obliquely outwardly from the bottom surface of a groove shape as shown in FIG. 4 instead of being formed to have such a cross-sectional shape that the opposite side surfaces vertically stand from the bottom surface of the groove shape as shown in FIG. 3.

As shown in FIG. 2, the exposed part 12c is arranged on the inner periphery of the groove part 15. An outer peripheral side of the exposed part 12c is covered by the resin forming the container 11. Specifically, the exposed part 12c is covered from a back surface 12f to end surfaces 12g shown in FIGS. 3 and 4 by a part of the resin around the projections 18 of the container 11. In this way, in the energy storage cell 10, safety against an electric shock and the like is enhanced without using an insulating cover.

In forming an energy storage module M10 by connecting a plurality of energy storage cells 10, the energy storage cells 10 can be so arranged that the side surfaces of the containers 11 where the groove parts 15 are formed are butted against each other since a pair of electrode terminals 12 do not project out of each container 11. For example, a plurality of energy storage cells 10 can be so arranged that the polygonal bottom surfaces overlap in the thickness direction of the containers 11 in conformity with the height, width and depth of an installation site. Further, a plurality of energy storage cells 10 can also be so arranged that the polygonal bottom surfaces of the containers are flush with each other in a direction perpendicular to the thickness direction of the containers 11. Further, a plurality of energy storage cells 10 can also be arranged by a combination of these arrangements. Thus, the energy storage cells 10 can be efficiently arranged, wherefore a degree of freedom in arrangement and layout is enhanced.

Next, an energy storage cell 20 according to a second embodiment of the present invention is described with reference to FIGS. 6 to 8. In each embodiment described below, configurations similar to the embodiment described above are denoted by the same reference signs and repeated description is omitted as appropriate. The following description is made with a plane bisecting a thickness T of the energy storage cell 20 as a plane C as shown in FIG. 8.

The energy storage cell 20 is an electric double-layer capacitor. As shown in FIG. 6, the energy storage cell 20 includes an energy storage part 13 for storing electric charges, a container 11 for housing the energy storage part 13 and a pair of electrode terminals 22 through which electric charges are charged into and discharged from the energy storage part 13.

The electrode terminals 22 include a positive electrode terminal 22A connected to a positive electrode 13a of the energy storage part 13 and a negative electrode terminal 22B connected to a negative electrode 13b of the energy storage part 13. The positive electrode terminal 22A and the negative electrode terminal 22B are respectively provided along the inner sides of a pair of bottom surfaces of the container 11 as shown in FIG. 6.

When a pair of groove parts 15 are respectively formed on a pair of facing side surfaces of the container 11, one electrode terminal 22 and the other electrode terminal 22 are both arranged in the pair of groove parts 15 respectively.

The electrode terminal 22 is composed of an exposed part 22c exposed to the outside of the container 11, a base end part 12e connected to a collector layer having a corresponding polarity in the container 11, and an intermediate part 12d connecting the exposed part 22c and the base end part 12e.

Figure 6:
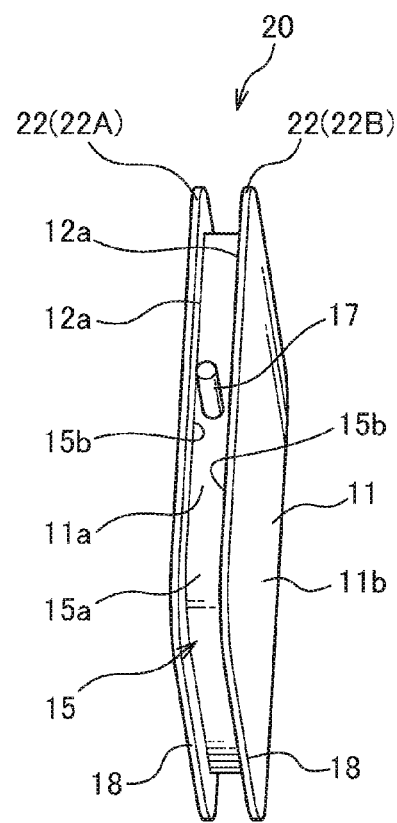
FIG. 6 is a perspective view of an energy storage cell according to a second embodiment of the present invention.

As shown in FIG. 6, the exposed part 22c is annularly formed along facing surfaces 15b of the groove part 15. The exposed part 22c of one electrode terminal 22 is arranged along one of the pair of facing surfaces 15b. The exposed part 22c of the other electrode terminal 22 is arranged along the other of the pair of facing surfaces 15b. That is, the exposed parts 22c of the electrode terminals 22 are respectively arranged to be symmetrical with each other with respect to the plane C shown in FIG. 8.

Figure 7:
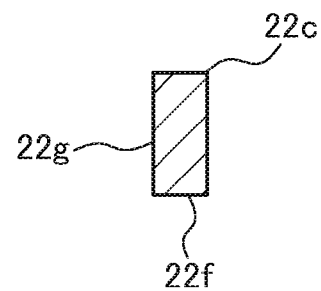
FIG. 7 is a sectional view of an electrode terminal.
Figure 8:
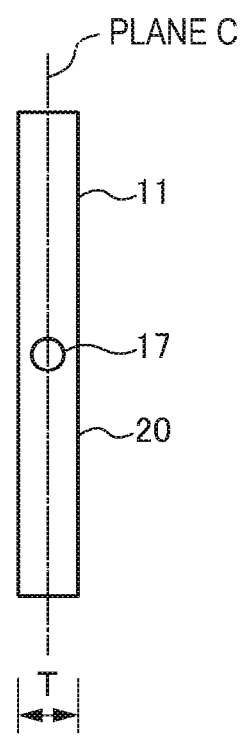
FIG. 8 is a view explaining the arrangement of the electrode terminal.

As shown in FIG. 7, the exposed part 22c is formed to extend along the facing surface 15b of the groove part 15 and have a rectangular cross-sectional shape. Thus, in the energy storage cell 20, the electrode terminals 22 do not project out of the container 11. Therefore, the size of the energy storage cell 20 including the electrode terminals 22 can be reduced.

Specifically, a volume occupied by the energy storage cell 20 can be reduced. Accordingly, volumetric efficiency which is an energy storage capacity per unit volume of the energy storage cell 20 is improved.

As shown in FIG. 6, the exposed part 22c is arranged on the inner periphery of the groove part 15. An outer peripheral side of the exposed part 22c is covered by the resin forming the container 11. Specifically, the exposed part 22c is covered from a back surface 22f to end surfaces 22g shown in FIG. 7 by a part of the resin around projections 18 of the container 11. In this way, in the energy storage cell 20, safety against an electric shock and the like is enhanced without using an insulating cover.

Figure 9:
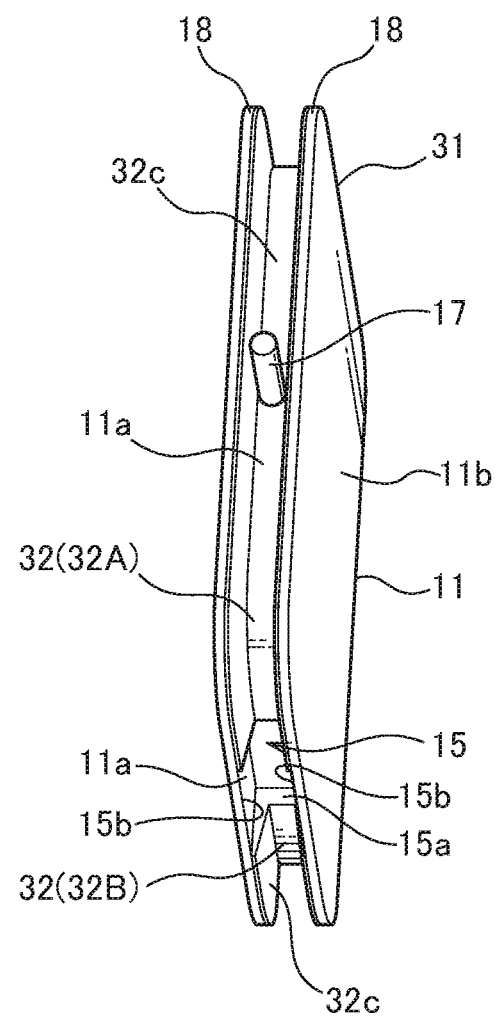
FIG. 9 is a perspective view of an energy storage cell according to a third embodiment of the present invention.

Next, an energy storage cell 30 according to a third embodiment of the present invention is described with reference to FIG. 9.

The energy storage cell 30 is an electric double-layer capacitor. As shown in FIG. 9, the energy storage cell 30 includes an energy storage part 13 for storing electric charges, a container 11 for housing the energy storage part 13 and a pair of electrode terminals 32 through which electric charges are charged into and discharged from the energy storage part 13.

The electrode terminals 32 include a positive electrode terminal 32A connected to a positive electrode 13a of the energy storage part 13 and a negative electrode terminal 32B connected to a negative electrode 13b of the energy storage part 13. The positive electrode terminal 32A and the negative electrode terminal 32B are respectively provided on a pair of mutually facing side surfaces of the container 11.

When a pair of groove parts 15 are respectively formed on a pair of facing side surfaces of the container 11, one electrode terminal 32 is arranged in one groove part 15 and the other electrode terminal 32 is arranged the other groove part 15.

The electrode terminal 32 is composed of an exposed part 32c exposed to the outside of the container 11, a base end part 12e connected to a collector layer having a corresponding polarity in the container 11, and an intermediate part 12d connecting the exposed part 32c and the base end part 12e.

The exposed part 32c is formed to have a U-shape extending from one side surface of the container 11 to the side surfaces on the opposite ends of the one side surface. The exposed part 32c is formed to continuously extend from a surface of the groove part 15 parallel to the plane B to surfaces perpendicular to the plane B. That is, the exposed part 32c is formed to extend from the side surface of the container 11 extending along the direction of the width W to the side surfaces continuously formed from the opposite ends of this side surface and extending along the direction of the height H. The exposed parts 32c of the electrode terminals 32 are respectively arranged to be symmetrical with each other with respect to the plane B shown in FIG. 5.

Out of the pair of electrode terminals 32, the positive electrode terminal 32A is formed with a hole allowing the passage of a degassing valve 17. The hole allowing the passage of the degassing valve 17 may be formed in the negative electrode terminal 32B instead of in the positive electrode terminal 32A.

The exposed part 32c is formed to extend along the groove part 15 and have a U-shaped cross-section. Thus, in the energy storage cell 30, the electrode terminals 32 do not project out of the container 11. Therefore, the size of the energy storage cell 30 including the electrode terminals 32 can be reduced. Specifically, a volume occupied by the energy storage cell 30 can be reduced. Accordingly, volumetric efficiency which is an energy storage capacity per unit volume of the energy storage cell 30 is improved.

Similarly to the exposed part 11c, the exposed part 32c is arranged on the inner periphery of the groove part 15 and an outer peripheral side thereof is covered by the resin forming the container 11. In this way, also in the energy storage cell 30, safety against an electric shock and the like is enhanced without using an insulating cover.

Next, the energy storage module M10 constituted by the plurality of energy storage cells 10 is described with reference to FIGS. 10 to 13.

Figure 10:
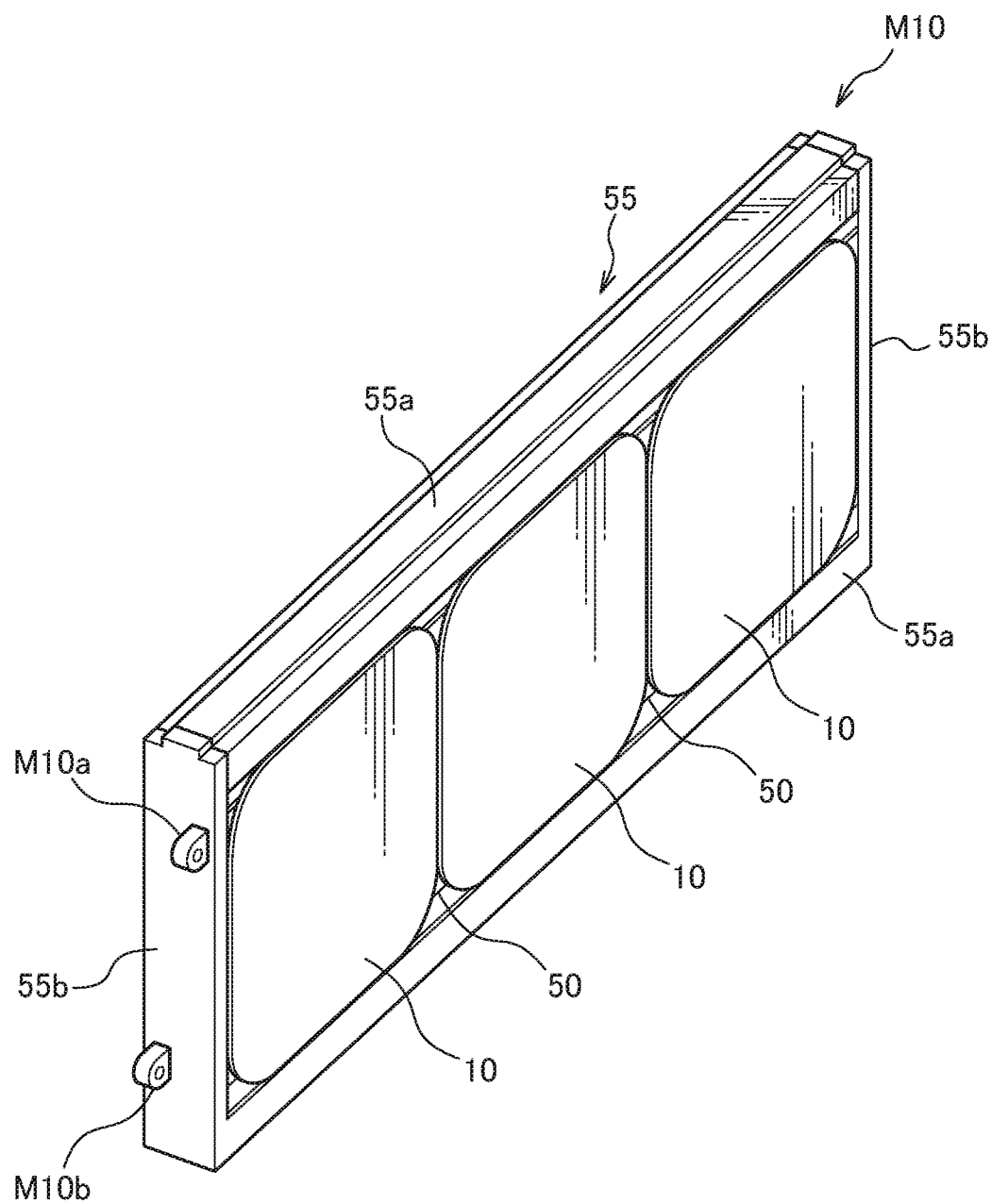
FIG. 10 is a perspective view of an energy storage module according to an embodiment of the present invention.

As shown in FIG. 10, the energy storage module M10 includes the plurality of energy storage cells 10 and a lattice-like module frame 55 in which the energy storage cells 10 are mounted. The energy storage module M10 is formed such that the plurality of energy storage cells 10 are arranged in a predetermined arrangement direction and adjacent energy storage cells 10 are electrically connected.

Figure 13:
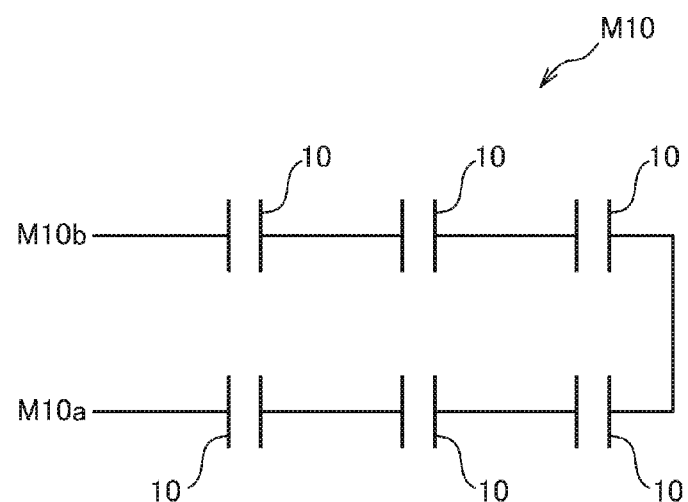
FIG. 13 is a circuit diagram of the energy storage module.

As shown in FIG. 13, the energy storage module M10 constitutes a circuit in which six energy storage cells 10 are connected in series. The energy storage module M10 has a six-fold voltage as compared with a voltage of the single energy storage cell 10.

Figure 11:
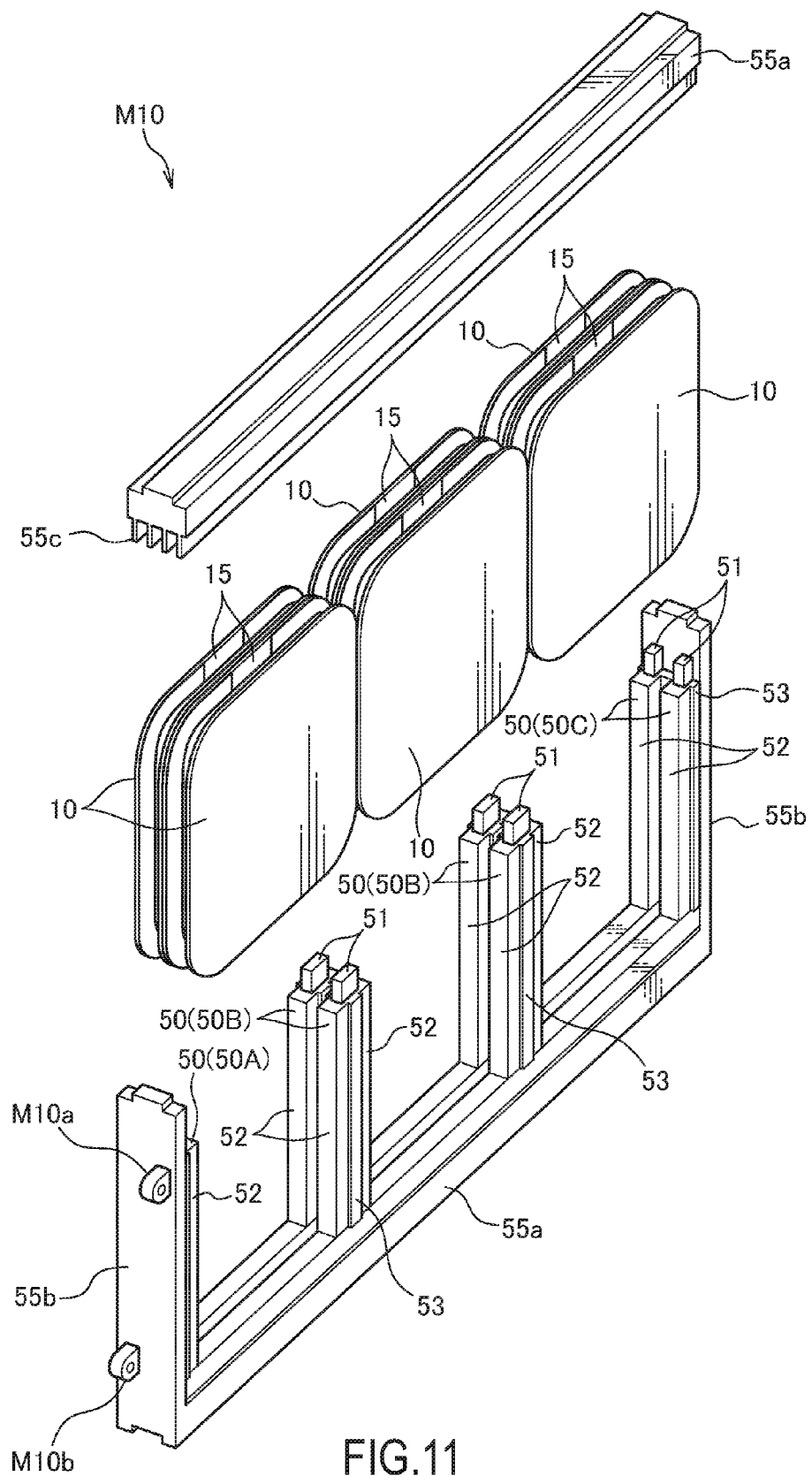
FIG. 11 is an exploded perspective view of the energy storage module.
Figure 12:
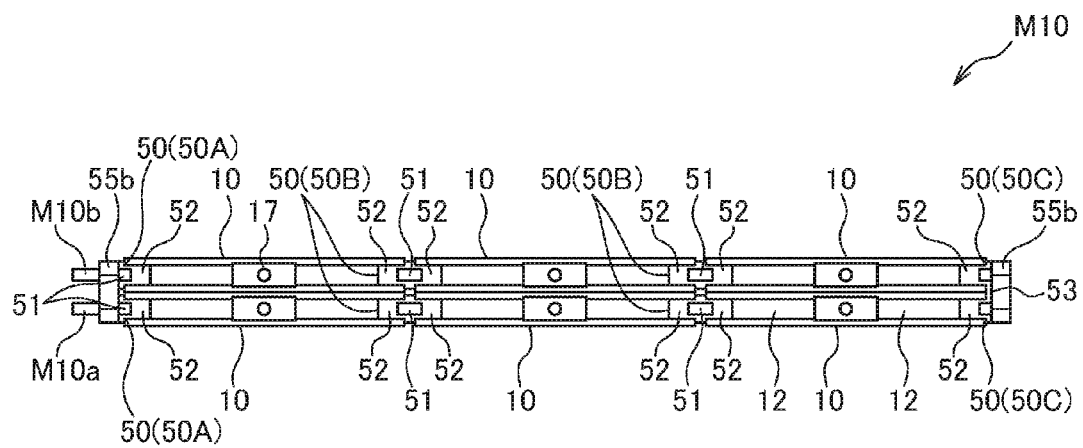
FIG. 12 is a plan view of the energy storage module.

As shown in FIG. 11, the module frame 55 is a lattice-like frame including a pair of first frame members 55a arranged in a long direction, a pair of second frame members 55b arranged in a short direction, and connecting members 50 electrically connecting adjacent energy storage cells 10. The module frame 55 is partitioned into a plurality of sections by the connecting members 50.

The plurality of sections of the module frame 55 are arranged one after another in a row in the long direction of the module frame 55. Two energy storage cells 10 are housed in each section of the module frame 55 while being laminated.

In each section, the energy storage cells 10 are so laminated and arranged that the front and rear surfaces of the containers 11 overlap in the direction of the thickness T of the containers 11. The energy storage cells 10 are so arranged that the front and rear surfaces of the containers 11 are flush and continuous in the long direction of the module frame 55, i.e. in a direction perpendicular to the thickness direction of the containers 11.

The pair of first frame members 55a and the pair of second frame members 55b form a rectangular outer frame of the module frame 55. The first and second frame members 55a, 55b are formed of an electrically insulating material such as resin.

The pair of first frame members 55a are provided in parallel to face each other. The first frame members 55a are respectively provided above and below the energy storage cells 10 arranged in the module frame 55. The first frame members 55a sandwich and fix the energy storage cells 10 from upper and lower sides.

Projections 55c to be fitted into the groove parts 15 of the energy storage cells 10 are formed on surfaces of the first frame members 55a to be held in contact with the energy storage cells 10. In this way, the energy storage cells 10 are fixed to the first frame member 55a.

The pair of second frame members 55b are provided in parallel to face each other. The second frame members 55b are arranged on the both ends of the first frame members 55a and respectively connect the both ends of the first frame members 55a.

The second frame member 55b includes a positive electrode terminal M10a and a negative electrode terminal M10b. The positive electrode terminal M10a and the negative electrode terminal M10b are both formed on one second frame member 55b.

The connecting members 50 fix the positions of the energy storage cells 10 and electrically connect the energy storage cells 10. The connecting member 50 includes a column part 51 to be fixed between the pair of first frame members 55a, an engaging part 52 to be engaged with the groove part 15 on the side surface of the energy storage cell 10 and a coupling part 53 connecting a plurality of engaging parts 52 in the arrangement direction of the energy storage cells 10. The engaging part 52 and the coupling part 53 are formed of an electrically conductive material.

As shown in FIG. 11, there are three types of connecting members 50, i.e. connecting members 50A, connecting members 50B and connecting members 50C.

The connecting members 50A respectively connect the energy storage cells 10 mounted in the module frame 55 to the positive electrode terminal M10a and the negative electrode terminal M10b. A pair of connecting members 50A are provided and held in contact with the one second frame member 55b on which the positive electrode terminal M10a and the negative electrode terminal M10b are both provided. The pair of connecting members 50A are electrically insulated from each other.

The pair of connecting members 50A is arranged in parallel in the direction of the thickness T of the energy storage cells 10. The connecting member 50A includes a single engaging part 52. In one connecting member 50A, the engaging part 52 and the positive electrode terminal M10a are electrically connected by the coupling part 53. In the other connecting member 50A, the engaging part 52 and the negative electrode terminal M10b are electrically connected by the coupling part 53. In this way, the energy storage cells 10 are connected to the positive electrode terminal M10a and the negative electrode terminal M10b.

The connecting member 50B electrically connects a pair of energy storage cells 10 arranged in the direction of the width W in series. A pair of connecting members 50B is arranged at each of two positions along the first frame members 55a. Pairs of connecting members 50B are arranged while being separated by the width W of the energy storage cells 10. The pair of connecting members 50B are electrically insulated from each other.

The pair of connecting members 50B is arranged in parallel in the direction of the thickness T of the energy storage cells 10. The connecting member 50B includes a pair of engaging parts 52 projecting in both directions along the first frame members 55a. The pair of engaging parts 52 is electrically connected by the coupling part 53. In this way, the pair of energy storage cells 10 is electrically connected.

The connecting members 50C electrically connect the pair of energy storage cells 10 arranged in the direction of the thickness T in series. A pair of connecting members 50C are provided and held in contact with the other second frame member 55b.

The pair of connecting members 50C is arranged in parallel in the direction of the thickness T of the energy storage cells 10. The connecting member 50C includes a single engaging part 52. The engaging parts 52 of the pair of connecting members 50C are electrically connected to each other by the coupling parts 53. In this way, the pair of energy storage cells 10 arranged in the direction of the thickness T are electrically connected.

The energy storage cells 10 are so housed into the respective sections that the electrode terminals 12 between the energy storage cells 10 adjacent in the long direction of the module frame 55 are connected in series via the respective connecting members 50. As shown in FIG. 11, the energy storage cells 10 are assembled into the respective sections in the direction of the height H with one first frame member 55a of the module frame 55 removed. In this way, the energy storage module M10 in which six energy storage cells 10 are connected in series can be simply and efficiently formed.

As just described, in the energy storage module M10, the energy storage cells 10 arranged in the predetermined arrangement direction can be simply and easily connected to each other by providing the connecting members 50 including the engaging part(s) 52 and the coupling part 53.

At this time, the engaging parts 52 are engaged with the groove parts 15 of the energy storage cells 10 and accommodated inside the groove parts 15. Thus, volumetric efficiency of the energy storage cells 10 is not reduced. Further, safety against an electric shock and the like can also be ensured.

If the energy storage cells 10 generate heat as being charged or discharged in the module frame 55, the amount of heat is transmitted from the electrode terminals 12 to the first and second frame members 55a, 55b via the connecting members 50. Thus, if the first frame members 55a, the second frame members 55b and the connecting members 50 are formed of a material having high thermal conductivity, heat radiation performance of the energy storage module M10 is enhanced. Therefore, it becomes easier to properly manage the temperature of the energy storage cells 10 housed in the module frame 55.

Next, an energy storage module M20 according to a modification is described with reference to FIGS. 14 to 17.

Figure 14:
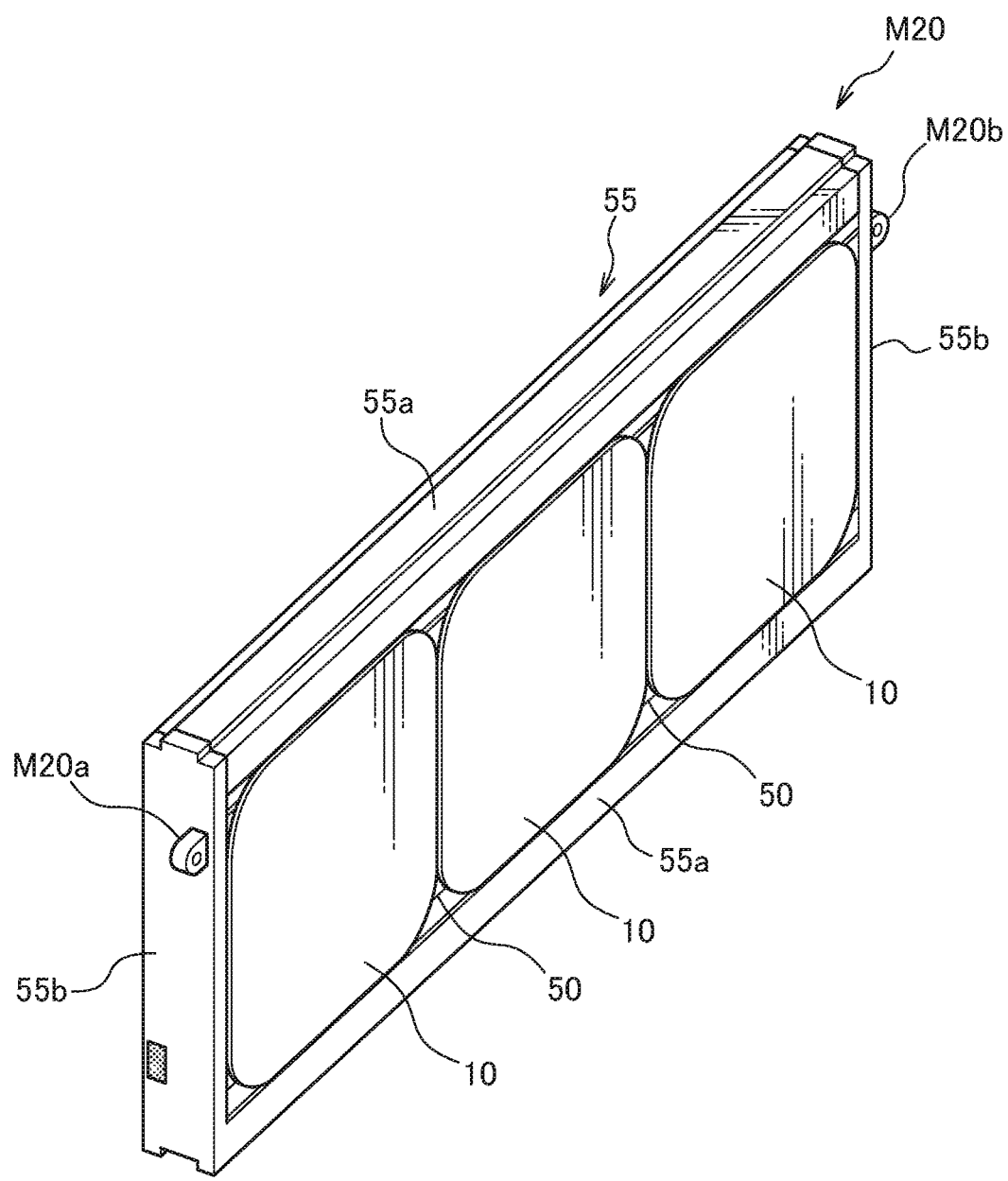
FIG. 14 is a perspective view showing a modification of the energy storage module.

As shown in FIG. 14, the energy storage module M20 includes a plurality of energy storage cells 10 and a lattice-like module frame 55 in which the energy storage cells 10 are mounted. The energy storage module M20 is formed such that the plurality of energy storage cells 10 are arranged in a predetermined arrangement direction and adjacent energy storage cells 10 are electrically connected.

Figure 17:
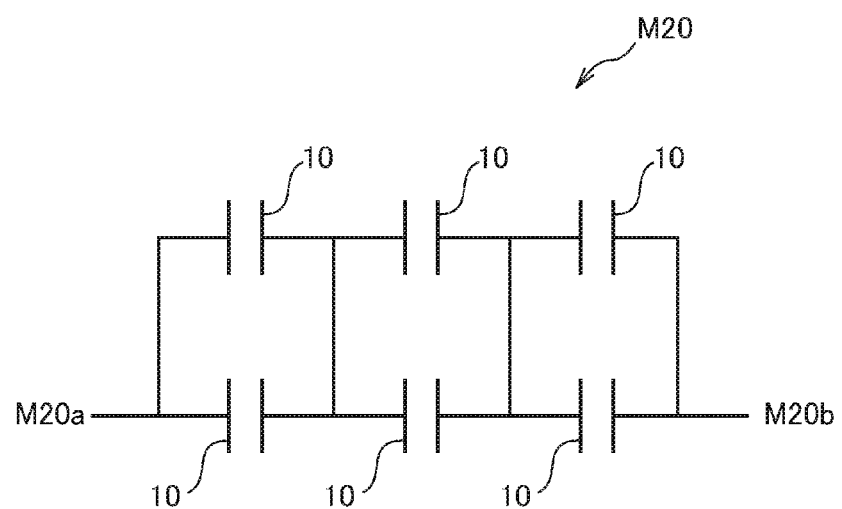
FIG. 17 is a circuit diagram of the energy storage module.

As shown in FIG. 17, the energy storage module M20 constitutes a circuit in which six energy storage cells 10 are connected three in series, two in parallel. The energy storage module M20 has a three-fold voltage and a two-fold capacitance as compared with the single energy storage cell 10.

Figure 15:
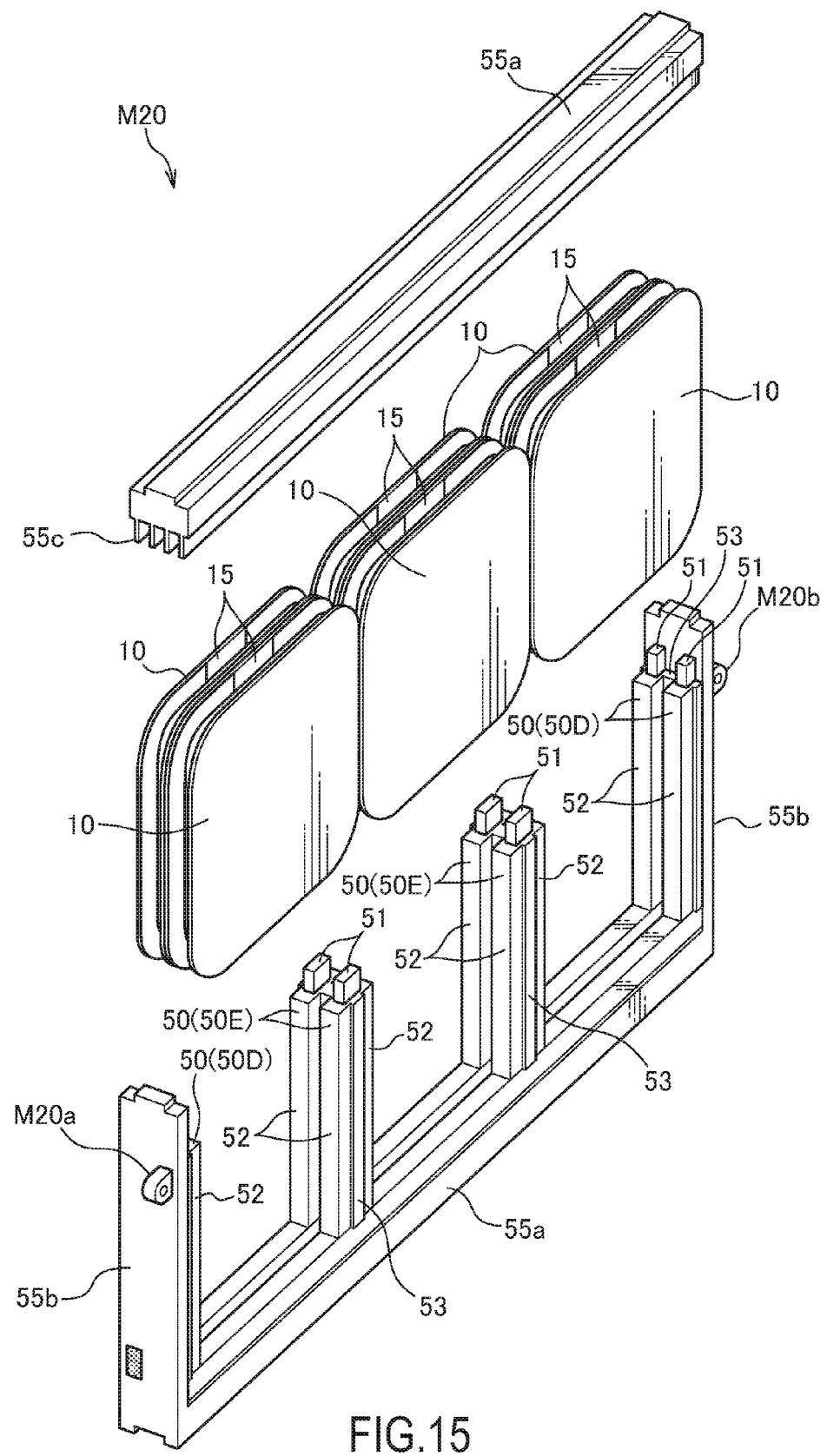
FIG. 15 is an exploded perspective view of the energy storage module.
Figure 16:
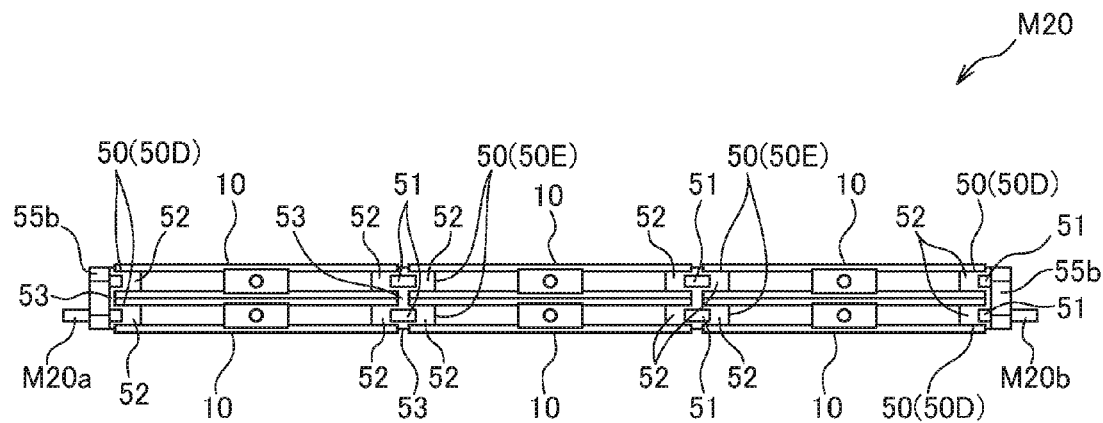
FIG. 16 is a plan view of the energy storage module.

As shown in FIG. 15, the module frame 55 is a lattice-like frame including a pair of first frame members 55a arranged in a long direction, a pair of second frame members 55b arranged in a short direction, and connecting members 50 electrically connecting adjacent energy storage cells 10.

The pair of second frame members 55b is provided in parallel to face each other. The second frame members 55b are arranged on the opposite ends of the first frame members 55a and respectively connect the both ends of the first frame members 55a.

The second frame members 55b include a positive electrode terminal M20a and a negative electrode terminal M20b. The positive electrode terminal M20a is formed on one second frame member 55b and the negative electrode terminal M20b is formed on the other second frame member 55b.

As shown in FIG. 15, there are two types of connecting members 50, i.e. connecting members 50D and connecting members 50E.

The connecting members 50D respectively connect the energy storage cells 10 mounted in the module frame 55 to the positive electrode terminal M20a and the negative electrode terminal M20b. A pair of connecting members 50D are provided at each of two positions. The connecting members 50D are respectively held in contact with the one second frame member 55b on which the positive electrode terminal M20a is provided and the other second frame member 55b on which the negative electrode terminal M20b is provided. The pair of connecting members 50D are electrically connected to each other.

The pair of connecting members 50D are arranged in parallel in the direction of the thickness T of the energy storage cells 10. The connecting member 50D includes a single engaging part 52. The engaging parts 52 of the pair of connecting members 50D are electrically connected to each other by a coupling part 53. In this way, the energy storage cells 10 are connected to the positive electrode terminal M20a and the negative electrode terminal M20b.

The connecting member 50E electrically connects a pair of energy storage cells 10 arranged in the direction of the width W in series. A pair of connecting members 50E is arranged at each of two positions along the first frame members 55a. Pairs of connecting members 50E are arranged while being separated by the width W of the energy storage cells 10. The pair of connecting members 50E is electrically connected to each other.

The pair of connecting members 50E is arranged in parallel in the direction of the thickness T of the energy storage cells 10. The connecting member 50E includes a pair of engaging parts 52 projecting in both directions along the first frame members 55a. The pair of engaging parts 52 is electrically connected by a coupling part 53. In this way, the pair of energy storage cells 10 is electrically connected.

The energy storage cells 10 are so housed into the respective sections that the electrode terminals 12 between the energy storage cells 10 adjacent in the long direction of the module frame 55 are connected three in series, two in parallel via the respective connecting members 50. As shown in FIG. 15, the energy storage cells 10 are assembled into the respective sections in the direction of the height H with one first frame member 55a of the module frame 55 removed. In this way, the energy storage module M20 in which six energy storage cells 10 are connected three in series, two in parallel can be simply and efficiently formed.

Next, an energy storage module M30 according to another modification is described with reference to FIGS. 18 to 21.

Figure 18:
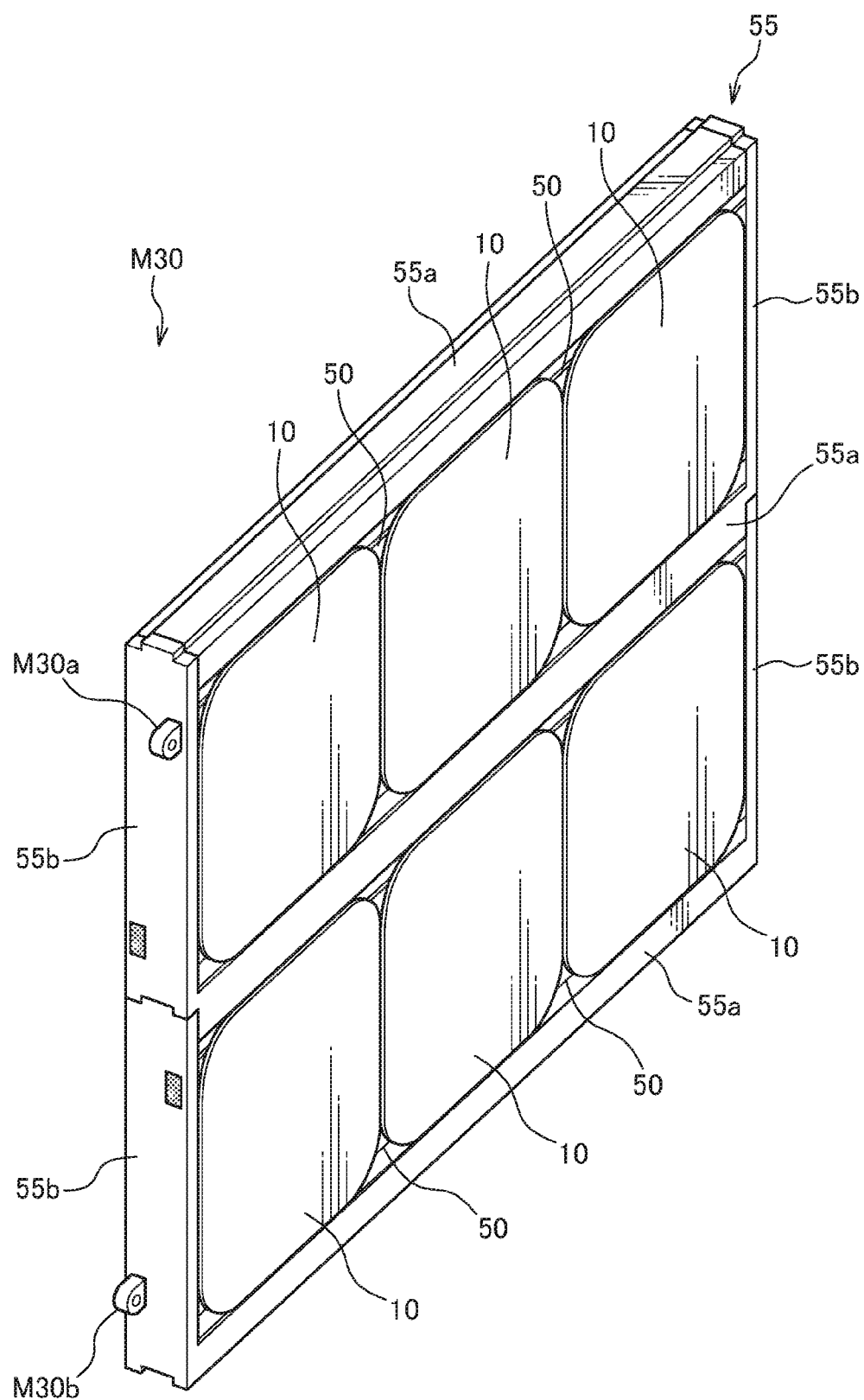
FIG. 18 is a perspective view showing another modification of the energy storage module.
Figure 19:
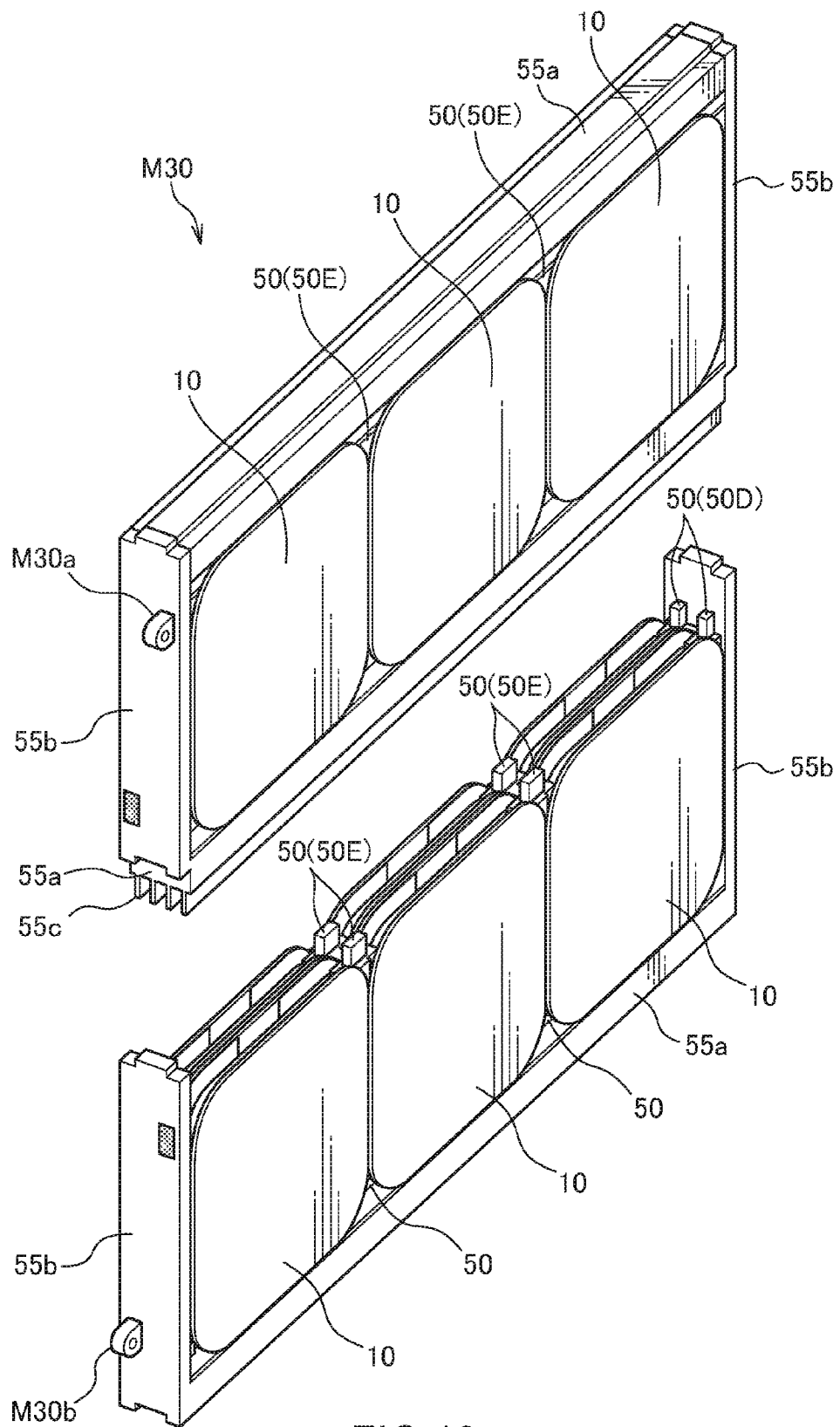
FIG. 19 is an exploded perspective view of the energy storage module.
Figure 20:
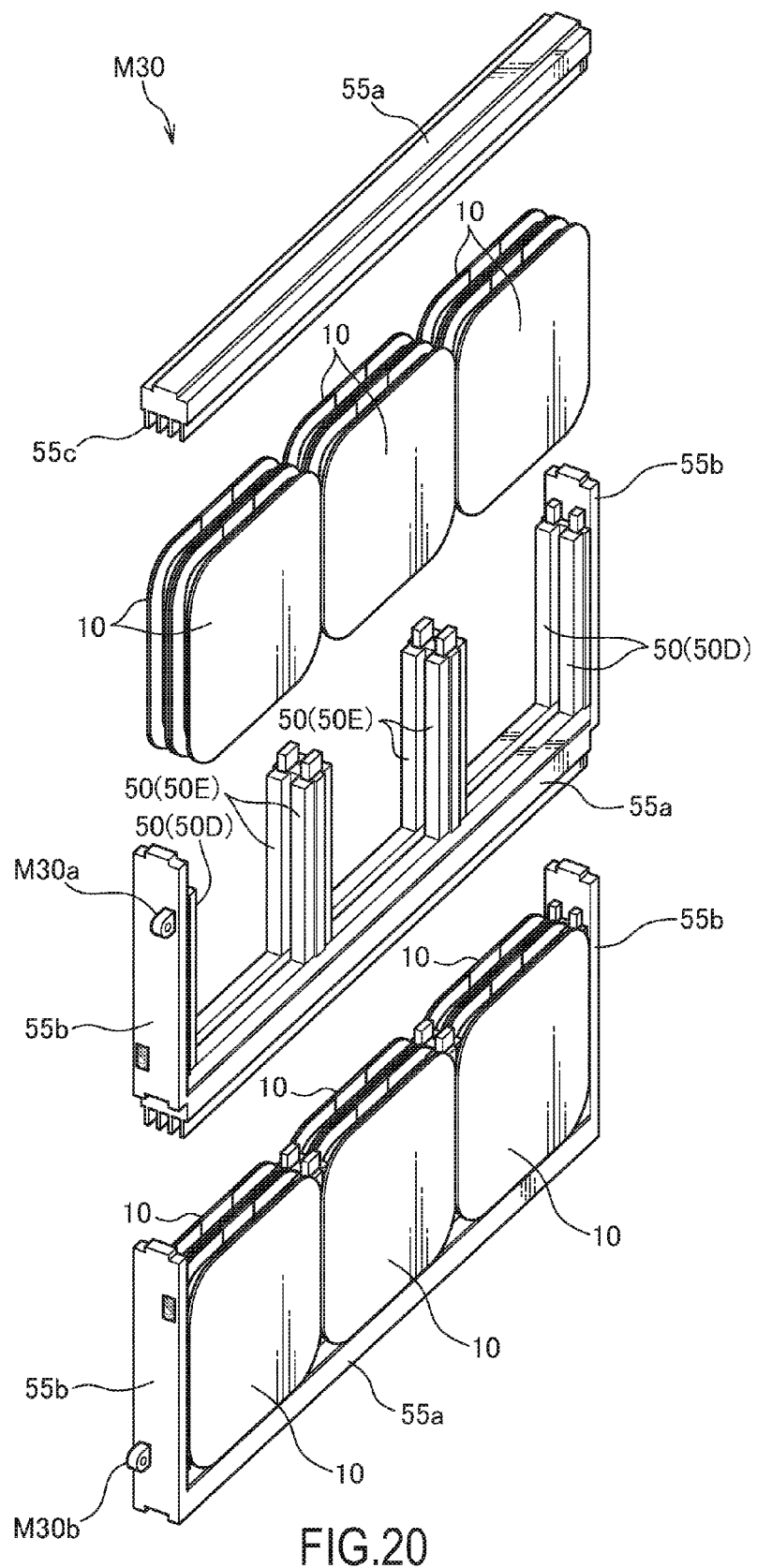
FIG. 20 is an exploded perspective view of the energy storage module.

As shown in FIG. 18, the energy storage module M30 includes the plurality of energy storage cells 10 and a lattice-like module frame 55 in which the energy storage cells 10 are mounted. The energy storage module M30 is formed such that the plurality of energy storage cells 10 are arranged in a predetermined arrangement direction and adjacent energy storage cells 10 are electrically connected.

Figure 21:
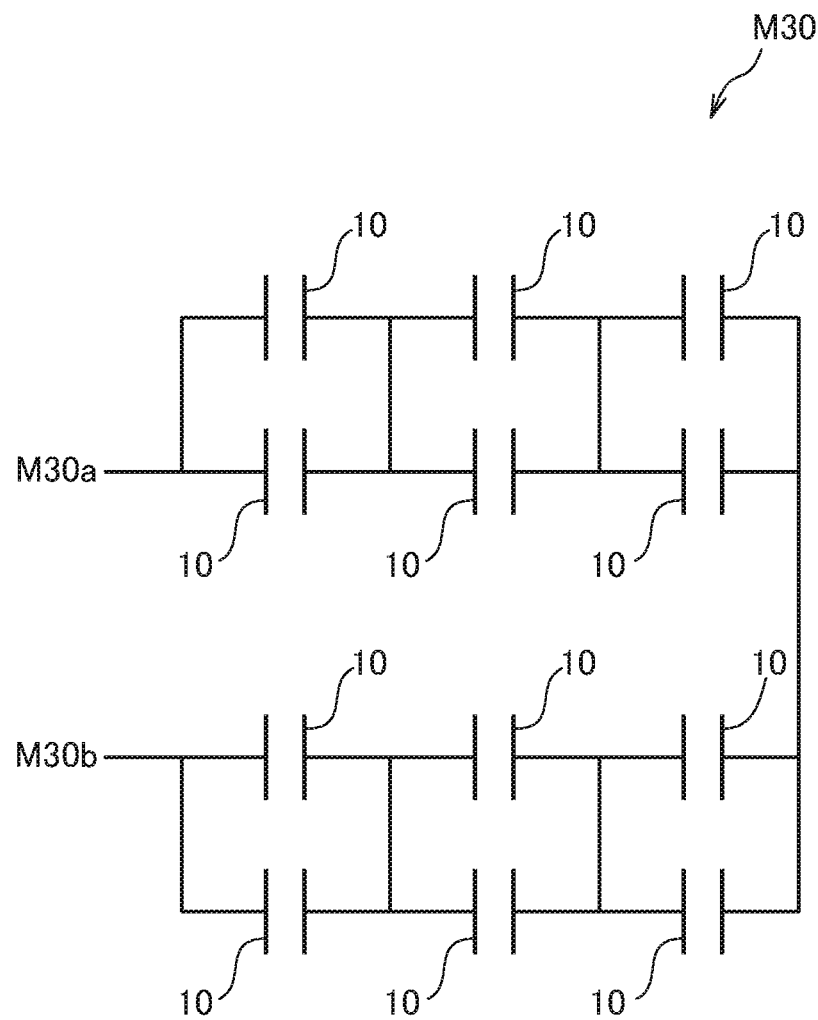
FIG. 21 is a circuit diagram of the energy storage module.

As shown in FIG. 21, the energy storage module M30 constitutes a circuit in which twelve energy storage cells 10 are connected six in series, two in parallel. The energy storage module M30 has a six-fold voltage and a two-fold capacitance as compared with the single energy storage cell 10.

As shown in FIG. 18, the energy storage module M30 is formed by two energy storage modules M20 connected in series. The energy storage module M30 is formed by overlapping the two energy storage modules M20 in the direction of the height H of the energy storage cells 10. In the energy storage module M30, the module frames 55 are connected in two levels.

Between the energy storage modules M20, the connecting members 50D provided along the one second frame members 55b are electrically connected by a busbar penetrating through the first frame member 55a. In this way, the two energy storage modules M20 are connected in series.

In the energy storage module M30, a positive electrode terminal M30a is formed on the second frame member 55b of the module frame 55 in the upper level. On the other hand, an negative electrode terminal M30b is formed on the second frame member 55b of the module frame 55 in the lower level.

In the energy storage module M30, the first frame member 55a between the module frames 55 placed one over the other is shared. Thus, volumetric efficiency of the energy storage module M30 is further improved.

The energy storage modules M10, M20 and M30 have been described as examples above. Even if the arrangement direction of the energy storage cells 10 is changed, it can be simply and easily dealt with by changing a connecting direction of the coupling parts 53 since such a change only changes a direction in which the engaging parts 52 are adjacent. For example, it is also possible to change the circuit in which the six energy storage cells are connected in series shown in FIG. 13 to the circuit in which the six energy storage cells are connected three in series, two in parallel shown in FIG. 17 by changing the connecting members 50 to different types of connecting members.

The energy storage cells 10 can be freely arranged in the three directions of the width W, height H and thickness T of the energy storage cells 10. Thus, the arrangement and layout of the energy storage cells 10 can be freely set in conformity with the height, width and depth of a site where the energy storage module is to be installed.

As for the energy storage capacity of an energy storage module, if X, Y and Z denote the number of the energy storage cells arranged in the direction of the height H of the energy storage cells 10, the number of the energy storage cells arranged in the direction of the width W and the number of the energy storage cells arranged in the direction of the thickness T, an energy storage module having an energy storage capacity which is a product of X and Y and Z can be simply and freely configured.

The cases where the energy storage cells 10 are used as a plurality of energy storage cells constituting the energy storage modules M10, M20 and M30 have been described above. However, the energy storage cells 20 or the energy storage cells 30 may be used instead of the energy storage cells 10.

In the case of using the energy storage cells 20, one exposed part 12c and the other exposed part 12c need to be insulated in the connecting members 50 so as not to be shorted to each other since the exposed parts 12c of the respective electrode terminals 12 are arranged to be symmetrical with respect to the plane C bisecting the thickness T.

In the case of using the energy storage cells 30, a recess corresponding to the shape of the degassing valve 17 needs to be formed in the connecting member 50 to prevent the interference of the connecting member 50 and the degassing valve 17.

Although the invention has been described above with reference to certain embodiments, the invention is not limited to the embodiments described above. Modifications and variations of the embodiments described above will occur to those skilled in the art, within the scope of the claims.

The contents of Tokugan 2010-151152, with a filing date of Jul. 1, 2010 in Japan, are hereby incorporated by reference.

The embodiments of this invention in which an exclusive property or privilege is claimed are defined as follows:

1. An energy storage cell, comprising:
an energy storage part for storing electric charges;
a container for housing the energy storage part; and
a pair of electrode terminals connected to the energy storage part and exposed to the outside of the container, wherein
the container has a polygonal outer shape which includes a top surface, a bottom surface and a pair of mutually facing side surfaces connecting the top and bottom surfaces;

a groove part is provided between the top and bottom surfaces of the polygonal shape, and linearly extends along each of the pair of mutually facing side surfaces; and each of the electrode terminals includes
a base end part connected to a corresponding polarity of the energy storage part in the container, and
an exposed part exposed to the outside of the container and formed along an inner side of the groove part.

2. The energy storage cell according to claim 1, wherein one of the pair of electrode terminals is arranged in one groove part and the other is arranged in the other groove part.

3. The energy storage cell according to claim 2, wherein the exposed part of the electrode terminal is formed to extend along the groove part and have a U-shaped cross-sectional shape.

4. The energy storage cell according to claim 1, wherein
the groove part includes a pair of facing surfaces facing each other, and one of the pair of electrode terminals is arranged on one of the pair of facing surfaces and the other electrode terminal is arranged on the other of the pair of facing surfaces.

5. The energy storage cell according to claim 1, wherein
the container includes a frame body in the form of a frame surrounding the energy storage part and films attached to the frame body to define a chamber for housing the energy storage part together with the frame body, and the groove parts are formed on side surfaces of the frame body.

6. The energy storage cell according to claim 5, wherein the pair of electrode terminals are insert-molded in the frame body.

7. An energy storage module, comprising:
a plurality of energy storage cells according to claim 1, wherein the plurality of energy storage cells is arranged in a predetermined arrangement direction and adjacent ones of the energy storage cells are electrically connected; and
a module frame having a lattice shape, wherein
the plurality of energy storage cells is mounted in respective sections of the lattice shape of the module frame.

8. The energy storage module according to claim 7, wherein the module frame includes:
engaging parts formed of an electrical conductive material and engaged with the groove parts of the energy storage cells; and
coupling parts formed of an electrical conductive material and configured to connect a plurality of the engaging parts in the arrangement direction of the energy storage cells.

9. The energy storage module according to claim 7, wherein the energy storage cells are arranged in a direction perpendicular to a thickness direction of the containers.

10. The energy storage module according to claim 7, wherein the energy storage cells are arranged in a thickness direction of the containers.

11. An energy storage cell, comprising:
an energy storage part for storing electric charges;
a container for housing the energy storage part; and
a pair of electrode terminals connected to the energy storage part and exposed to the outside of the container,
wherein
the container is formed to have a thick polygonal outer shape;
a groove part linearly extending in a direction perpendicular to a thickness direction is provided in each of a pair of mutually facing side surfaces of the polygonal shape;
each of the electrode terminal includes
a base end part connected to a corresponding polarity of the energy storage part in the container, and
an exposed part exposed to the outside of the container, and the exposed part is formed along an inner side of the groove part;
the container includes
a frame body in the form of a frame surrounding the energy storage part and
films attached to the frame body to define a chamber for housing the energy storage part together with the frame body; and
the groove parts are formed on side surfaces of the frame body.

12. The energy storage cell according to claim 11, wherein the pair of electrode terminals are formed in the frame body by insert molding.

* * * * *